United States Patent [19]

Gay et al.

[11] Patent Number: 5,390,246
[45] Date of Patent: Feb. 14, 1995

[54] PORTABLE MULTIMEDIA MARKETING SYSTEM

[76] Inventors: Jean-Philippe Gay, 21530 Marchena St.; Douglas M. Brown, III, 5225 Penfield Ave., both of Woodland Hills, Calif. 91364

[21] Appl. No.: 49,150

[22] Filed: Apr. 19, 1993

[51] Int. Cl.[6] .......................................... H04R 25/00
[52] U.S. Cl. ........................................ 381/24; 381/82
[58] Field of Search .................... 381/24, 82; 220/528, 220/503, 504, 507; 206/320, 328; 190/903, 109

[56] References Cited

U.S. PATENT DOCUMENTS 5,218,389 6/1993 Harlon et al. ........................ 353/122

OTHER PUBLICATIONS

Sharp LCD Color Monitor 6M-4OU Operation Manual.
Sony Video Recorder/Monitor GV-S50 Operating Instructions Copyright, 1992.
Sony Stereo Active Speaker System SRS-88 Operating Instructions Copyright 1991.
Virtual Vision Sport Brochure entitled "Reality Now Comes With The Chance to Change Channels".
NASA Tech Briefs vol. 15 No. 9, Sep. 1991, "True 3D On Your PC/Workstation".
"Sony Video Recorder/Monitor GV-S50 Operating Instructions", 1991.

*Primary Examiner*—Curtis Kuntz
*Assistant Examiner*—Sinh Tran
*Attorney, Agent, or Firm*—Christie, Parker & Hale

[57] ABSTRACT

A portable multimedia marketing system is useful for playing back prerecorded audiovisual presentations. A portable carrying case holds the various components which include an audio and video playback device for playing the presentations. A presenter's monitor is used by the presenter to monitor the video portion of the presentation and a hand-held customer monitor is used by the person to whom the presentation is directed for viewing the video portion of the presentation. A pair of loudspeakers removably mounted within the carrying case provide the audio portion of the presentation. While the loudspeakers may be removed, from the carrying case, they are designed to remain in the case during use. Various umbilicals provide power, audio and video signals to or from the individual components.

2 Claims, 3 Drawing Sheets

PORTABLE MULTIMEDIA MARKETING SYSTEM

BACKGROUND OF THE INVENTION

This invention relates to a portable multimedia marketing system to aid a person in making a sales presentation. More particularly, it relates to a portable audio visual system for playing back prerecorded audiovisual presentations.

Portable electronic components and devices for playing back audio and visual recordings are well known. For example, the Sony Walkman and similar devices have become well known and popular. These devices generally comprise a portable audio cassette player with a battery or other portable source of power and earphones for listening to prerecorded audio cassette tapes. More recently, similar devices have been developed which include a portable compact disc player rather than a portable audio cassette player.

Manufacturers have also developed portable speakers for use with such portable audio systems which can be used to replace the earphones. Some of these speakers also include self contained amplifiers so as to overcome the relatively weak signal produced by a portable unit that is normally only sufficient to drive a pair of earphones.

Portable video players have also been recently developed. For example, the Sony Video Walkman is a portable device that includes an 8 mm video cassette player and a built in LCD video monitor. Similar devices are also available for other formats of video cassettes such as the VHS-C format, as well as digital recordings on CDI or laser disc format.

However, the prior art does not disclose or suggest a portable multimedia marketing system utilizing these and other components in combination as defined in the present invention in order to aid a salesperson in making a sales presentation.

SUMMARY OF THE INVENTION

The inventive portable multimedia marketing system for playing prerecorded materials for marketing presentations includes a portable carrying case for carrying the various components as a single self-contained unit. A portable audio and video playback device is removably mounted within the case and is used for playing the prerecorded presentations.

A first video monitor is also removably mounted within the case and is used by the person to which the presentation is being made so that he or she may view the video portion of the presentation. A second video monitor preferably provided as a part of a combined unit comprising a video monitor and the audio and video playback device is used by the presenter in monitoring and controlling the prerecorded presentation.

A pair of loudspeakers are also provided in the carrying case. While these speakers may be removed if desired, they are designed to be capable of being used while remaining in the case. This assures greater portability of the system and makes the setup of the system simpler and faster than if the speakers were required to be removed for use. In another embodiment a pair of speakers are built into the case rather than being removable stand alone units.

In the preferred embodiment the case also includes a jack panel containing a plurality of jacks so that additional audio and video devices can be connected to the system. Alteration of the video and audio formats for larger scale presentations can be accomplished when the presentation is to be made before a larger group of people rather than an individual. For example, a presentation can be effectively made before an entire auditorium of people by connecting a large screen television to a video jack in the panel. Similarly, larger and more powerful loudspeakers could be connected to the audio jacks.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

The portable multimedia marketing system of this invention provides a very useful tool in making effective multimedia presentations. When assembled the system is very compact and is small enough to be taken aboard an airplane as carry-on luggage. In spite of its portability, the system is capable of producing high quality audio and video presentations providing an excellent demonstration of a product or service.

Figure 1:
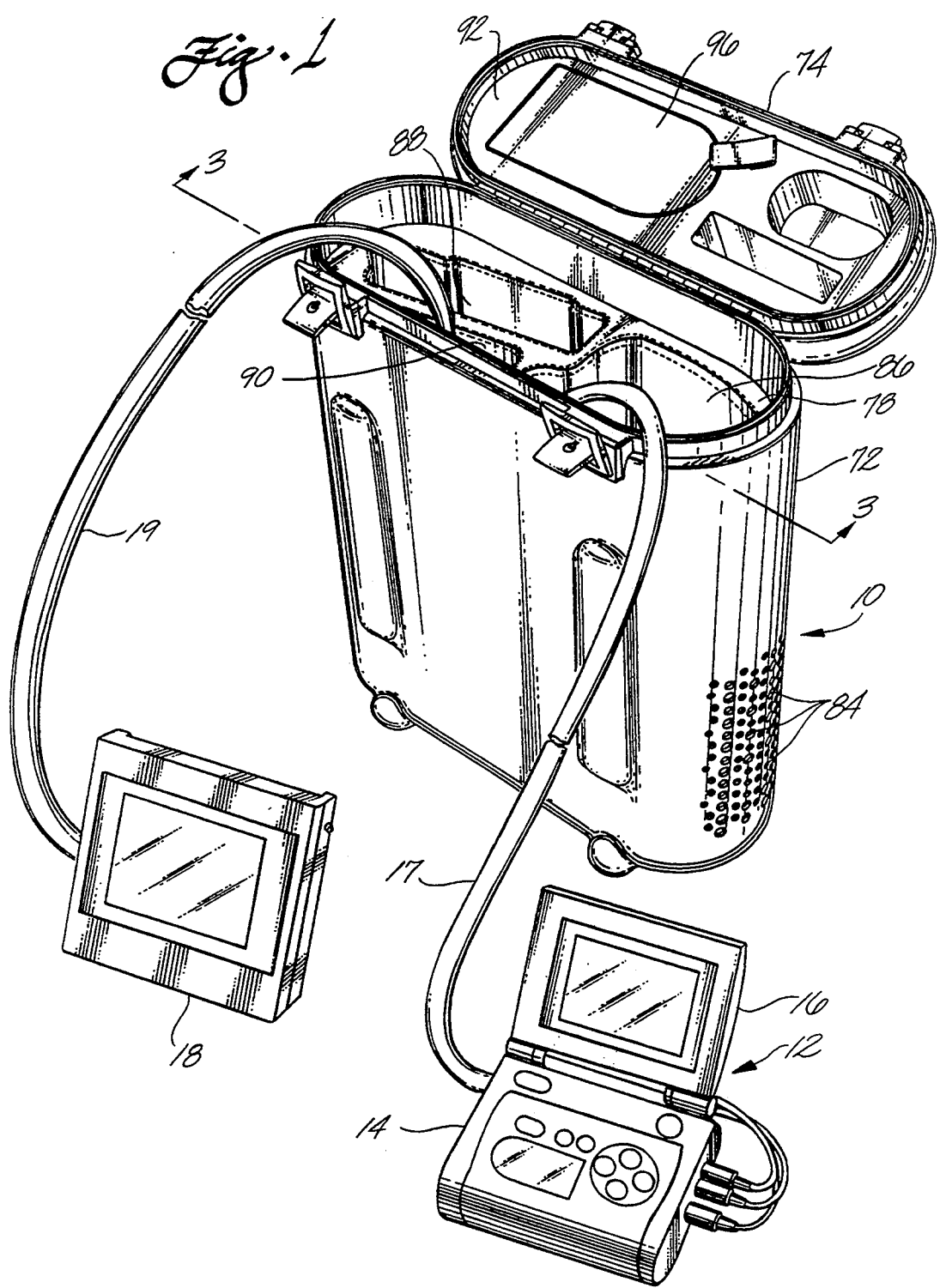
FIG. 1 is a perspective view of a portable multimedia marketing system of the present invention showing the system as it is used.
Figure 2:
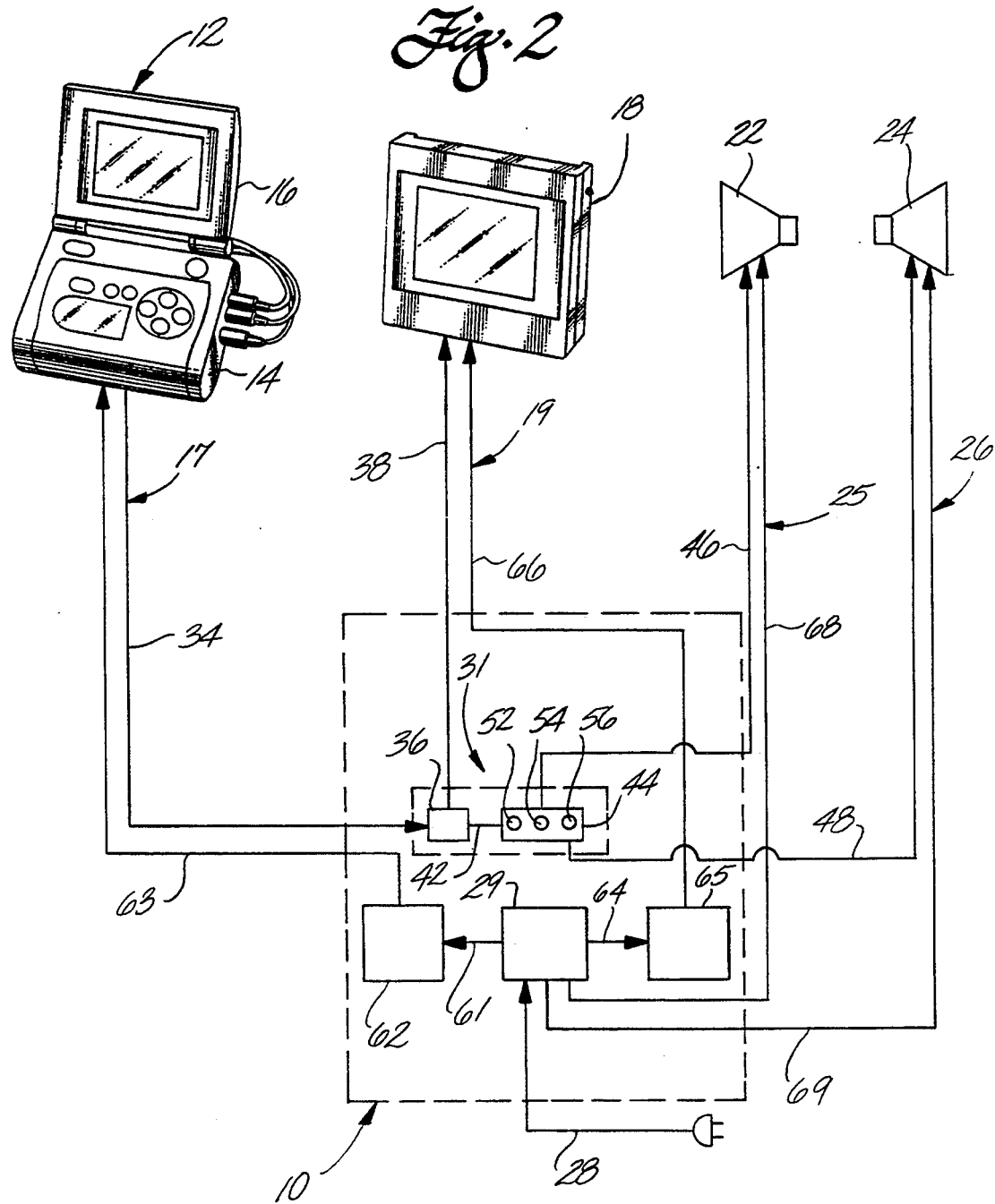
FIG. 2 is a schematic drawing illustrating the components of the system.

With regard to FIG. 1 the system is shown as it appears in use. In FIG. 2, the system is illustrated schematically. A carrying case 10 is used for containing the various components of the system. A combined audio and video playback device and monitor 12 is used by the presenter in controlling and monitoring the presentation. The device includes an audio and video playback device or audio-video player 14 into which tapes or some other audio-video media containing the prerecorded presentation are inserted and played. A presenter's monitor 16 is provided so that the presenter can monitor and control the visual portion of the presentation. In the preferred embodiment, the combined audiovisual player and presenter's monitor are provided in a single player/monitor unit such as a Sony Video Recorder/Monitor 8, Model No. GV-S50, also known as a Sony Video Walkman.

The various electrical cables that provide electrical power to the combined player/monitor unit and the audio and video signals from the unit are contained in a first umbilical 17. The first umbilical extends from the player/monitor unit to a power distribution circuit 29 and a signal distribution circuit 31, both located in the carrying case.

A customer monitor 18 is also provided and is used by the person for whom the presentation is being made to view the video portion of the presentation. While the presenter's monitor is merely for monitoring the presentation, and a black and white LCD screen may be preferred for cost reasons, the customer monitor generally has a slightly larger viewing screen and provides a higher quality color picture. In the preferred embodiment, a device such as a Sharp LCD Color Monitor, Model 6M-40U, is used for the customer monitor. Such a device is small enough and light enough to be hand held, yet provides an excellent quality picture. A hand held customer monitor is preferred as it provides physical interaction for the customer as he or she is viewing the presentation while holding the monitor in his or her hands. The customer monitor is connected to the power distribution circuit and the signal distribution circuit by a second umbilical 19.

A pair of speakers 22 and 24 are removably mounted within the carrying case, but designed to remain in the carrying case while in use. While both the combined player-monitor unit and the customer monitor include built-in speakers, such speakers are normally muted so that the main speakers provide the audio portion of the presentation. In order to obtain a high quality stereo sound it is preferred that the speakers be directed in opposite directions from one another so that the audio output from the speakers reflects off nearby walls to provide a full and rich stereo effect. In the embodiment shown in the drawings, the case incorporates semicylindrical sides which define a plurality of spaced perforations. The speakers are supported in the case and oriented for output through the perforations.

While in the embodiment shown, the speakers are stand-alone units that are removably mounted within the carrying case, the speakers can also be physically built into the carrying case. While such an embodiment provides less flexibility in that the speakers cannot be removed, it generally provides for a smaller overall size for the system. In the presently preferred embodiment, removable speakers manufactured by Sony and referred to as the Stereo Active Speaker System, Model No. SRS-88, have been shown to provide high quality stereo sound.

Speakers such as these are provided with magnetic shielding so as to reduce the magnetic effects that can be caused by placing a television screen or recorded tape near a magnetic speaker unit. Furthermore, the speakers each include a built-in power amplifier so that the audio output is not limited by the relatively small amplifier provided in the player unit. When the speakers are removed from the carrying case, third and fourth umbilicals 25 and 26 provide power and audio signals to the speakers.

In another embodiment, a single amplifier is provided to supply power to both speakers. This is especially useful if the speakers are built into the case.

The system also includes a single power cord 18 which feeds power from a typical electrical outlet directly to the carrying case. Inside the carrying case the power is routed to a power distribution circuit 29 for providing power to the individual components including the speakers, monitors and player unit.

If desired, the system can also be operated using DC power provided by battery packs. However, if the system is to be used without external AC power the main speakers generally cannot be used and the speakers built into the customer monitor and combined player-monitor unit are used for audio generation. Similarly, personal earphones are used as an alternative when the unit is operating on battery power.

When the system is to be used, an audio-video cassette (not shown) is placed into the audio-video player 14 which is controlled by the presenter. When the presenter starts the presentation a first combined audio-video signal is transmitted to the presenter's monitor 16 so that the presenter can view and control the presentation at the same time that the customer is viewing the playback.

A second combined audio-video signal 34 is transmitted from the player to a splitter 36. From the splitter a third combined audio-video signal 38 is transmitted to the customer monitor 18 for viewing of the video portion of the presentation by the customer. Also from the splitter, a fourth combined signal 42 is transmitted to a jack panel 44 where the signal is separated into separate audio and visual components. The splitter and jack panel together form a signal distribution circuit 31. A pair of audio signals 46 and 48, one for each channel of a stereo audio signal, are transmitted from the jack panel to stereo speakers 22 and 24 which provide the audio portion of the presentation.

While in the embodiment described, combined audio-video signals are provided to the two monitors, it is clear that video signals alone can be provided to the monitors. However, the use of a combined signal provides added flexibility as speakers built into the monitors are available for use as previously described.

The jack panel is preferably mounted on the carrying case and includes three separate jacks which allow the audio and visual signals to be transmitted to external video monitors and/or speaker systems. The jacks include a video jack 52 and stereo speaker jacks 54 and 56. These three video jacks are employed when the presentation is desired to be made before a large number of customers. For example, the portable multimedia marketing system of the present invention can be used along with a large screen television connected to the system at the video jack and a separate stereo system connected to the stereo speaker jacks to provide a presentation to an entire auditorium of people. The jacks are also useful in the event that a second portable customer monitor is desired to be played simultaneously such as when the presentation is to be made to a pair of customers.

Conventional AC power supplies the system by an AC power supply line 28. A power distribution circuit 29 is located in the carrying case for receiving the power supply. From the distribution circuit, a first AC power signal 61 is fed to a first AC/DC converter 62 that converts the first AC power signal to a first DC power signal 63 for powering the player-monitor unit. A second AC power signal 64 is fed from the power distribution circuit to a second AC/DC converter 65 for converting the second AC power signal to a second DC power signal 66 for powering the customer monitor. Third and fourth AC power signals 68 and 69 feed power from the power distribution circuit to the speakers.

While a power system with various AC and DC components is described, it is clear that other combinations are possible. As discussed previously, an entirely DC system can be utilized with batteries as the power source. The batteries can either be located in the individual components, or centrally in the carrying case.

Figure 3:
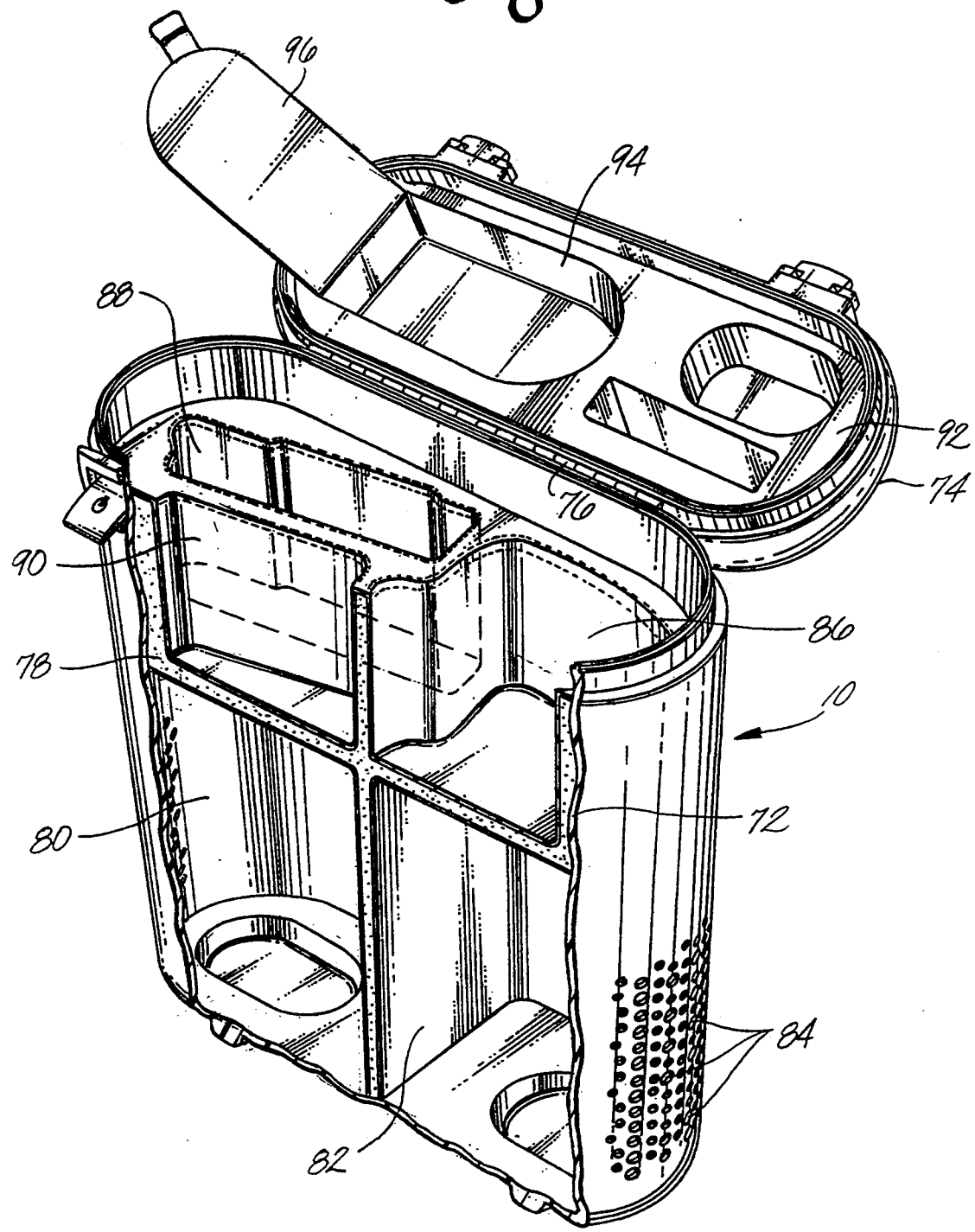
FIG. 3 is a perspective view of the carrying case partially cut away at line 3—3 of FIG. 1.

The details of the carrying case are shown in FIG. 3. The carrying case is defined by walls 72 which are designed to contain the various components of the system. The carrying case is preferably made of an injection molded polymer that is both lightweight and strong. A lid 74 mounted on a hinge 76 provides access to the interior of the carrying case.

Within the carrying case is a padded foam insert 78 which is useful for protecting the components during transportation. Speakers 22 and 24 are mounted in the lower section of the carrying case in compartments 80 and 82. The walls of the case define a spaced plurality of perforations 84 which allow both ventilation of the carrying case and outlets for the audio signals from the speakers. Compartments 86 and 88 are provided in the padded foam insert for containing the combined player and monitor unit and the customer monitor, respectively. A compartment 90 is provided for containing the first and second umbilicals when not in use.

Additional foam padding 92 is provided on the lid to further protect the components. A lid compartment 94 with a flap lid 96 provides convenient storage for the power cord 28. Optional features that are not shown include additional compartments for storage of additional electrical cords, tapes or other components.

While one preferred embodiment has been described thus far, other preferred embodiments are also available. For example, the audio-visual player 14 has been generally described as one suitable for playing 8 mm video recordings. However, other format recordings such as VH-SC or digital recordings such as CDI or laser disc are available for other applications.

In another embodiment, rather than using a conventional video monitor for the customer monitor 18, optic glasses such as are produced by the company Stereo Graphics can be used as a substitute. Similarly, stereo optic glasses can be used to replace the customer monitor. A further alternative includes earphones built into the glasses for use with such optic glasses as a replacement for stereo speakers 22 and 24.

As shown, workers skilled in the art and technology to which this invention pertains will appreciate that alterations and changes in the described structure may be practiced without meaningfully departing from the principle, spirit and scope of the this invention. Accordingly, the foregoing description should not be read as pertaining only to the precise structures described and illustrated in the accompanying drawings and discussion, but rather should be read consistent with and as support to the following claims which are to have their fullest and fair scope.

What is claimed is:

1. A portable multimedia marketing system comprising:
   a self-contained integral carrying case comprising a hinged cover portion and a main body portion, the main body portion comprising:
   a pair of semi-cylindrical sides defining a spaced plurality of perforations;
   a power distribution circuit for receiving external AC power;
   a signal distribution circuit comprising a jack panel having a plurality of output jacks;
   first and second padded compartments;
   first and second speaker compartments;
   a portable audio and video playback device removably mounted within the first padded compartment of the carrying case for producing a first combined audio-video signal and a second combined audio-video signal;
   a first portable hand-held video monitor attached to the portable audio and video playback device for receiving the first combined audio-video signal and displaying a first video image;
   a first umbilical cable for carrying power from the power distribution circuit to the portable audio and video playback device and for carrying the second combined audio-video signal from the portable audio and video playback device to the signal distribution circuit;
   a second hand-held video monitor removably mounted within the second padded compartment of the carrying case for receiving a video signal and displaying a second video image;
   a second umbilical cable for carrying power from the power distribution circuit to the second video monitor and for carrying the video signal from the signal distribution circuit to the second video monitor; and
   a pair of magnetically shielded speakers mounted within the first and second speaker compartments of the carrying case, each speaker receiving a channel of audio signal from the signal distribution circuit, each of said speakers mounted within one of the pair of semi-cylindrical sides of the body portion and oriented to direct sound through the perforations therein, the speakers mutually oriented in opposite directions from each other.

2. A portable multimedia marketing system as defined in claim 1 wherein the speakers include amplifiers and are removable from the first and second speaker compartments of the carrying case, the system further comprising third and fourth umbilical cables, each of which is for transmitting both power from the signal distribution circuit and the channel of the audio signal from the power distribution circuit to a speaker.

* * * * *